US010082185B1

(12) United States Patent
Shih et al.

(10) Patent No.: US 10,082,185 B1
(45) Date of Patent: Sep. 25, 2018

(54) BRAKE MECHANISM FOR ROTARY WORK TABLE OF MACHINE TOOL

(71) Applicant: AWEA MECHANTRONIC CO., LTD., Hsinchu (TW)

(72) Inventors: Shih-Syue Shih, Nantou (TW); Su-Wei Chen, Hsinchu (TW)

(73) Assignee: AWEA MECHANTRONIC CO., LTD., Hsinchu (TW)

( * ) Notice: Subject to any disclaimer, the term of this patent is extended or adjusted under 35 U.S.C. 154(b) by 71 days.

(21) Appl. No.: 15/454,217

(22) Filed: Mar. 9, 2017

(51) Int. Cl.
| B23Q 16/10 | (2006.01) |
| F16D 55/22 | (2006.01) |
| F16D 65/16 | (2006.01) |
| F16D 121/12 | (2012.01) |
| F16D 121/14 | (2012.01) |

(52) U.S. Cl.
CPC ............ F16D 55/22 (2013.01); B23Q 16/105 (2013.01); F16D 65/16 (2013.01); F16D 2121/12 (2013.01); F16D 2121/14 (2013.01)

(58) Field of Classification Search
CPC ...... B23Q 16/102; B23Q 16/105; F16D 65/02
USPC ........ 188/166, 170, 382; 267/137; 74/813 C, 74/813 L
See application file for complete search history.

(56) References Cited

U.S. PATENT DOCUMENTS

| 2009/0235783 | A1* | 9/2009 | Duane | B23Q 16/102 74/813 C |
| 2010/0319487 | A1* | 12/2010 | Tatsuda | B23Q 16/102 74/813 L |
| 2015/0239087 | A1* | 8/2015 | Itou | B23Q 1/25 269/20 |
| 2015/0360337 | A1* | 12/2015 | Nishimura | G05B 19/4155 269/57 |
| 2015/0367470 | A1* | 12/2015 | Tezuka | B23Q 1/522 269/55 |
| 2016/0243660 | A1* | 8/2016 | Nishimura | B23Q 16/105 |
| 2017/0239770 | A1* | 8/2017 | Tachiki | B23Q 16/105 |

* cited by examiner

Primary Examiner — Christopher P Schwartz
(74) Attorney, Agent, or Firm — Harness, Dickey & Pierce, P.L.C.; Anthony G. Fussner

(57) ABSTRACT

A brake mechanism has a brake disk, multiple clutches, and multiple brake assemblies. The brake disk is coaxially connected to a rotatable work table. The multiple clutches are capable of clamping the brake disk. The multiple brake assemblies correspond in position to the multiple clutches. Each one of the multiple brake assemblies has a housing, an abutting shaft inserted in the housing, and multiple elastic units received in the housing and abutting against the abutting shaft. The multiple abutting shafts of the multiple brake assemblies abut against the brake disk for stopping the work table from rotating. A hydraulic system applies hydraulic pressure inside the multiple housings of the multiple brake assemblies and forces the multiple abutting shafts to depart from the corresponding clutch, making the work table rotate again.

10 Claims, 6 Drawing Sheets

BRAKE MECHANISM FOR ROTARY WORK TABLE OF MACHINE TOOL

FIELD

The present disclosure relates to a machine tool, and more particularly to a brake mechanism that may rapidly stop a work table from rotating to prevent damage to mechanism of the machine tool.

BACKGROUND

This section provides background information related to the present disclosure which is not necessarily prior art.

Since design of appearance and structure of a product is getting more and more complicated, a conventional machine tool is provided with multiple axes for achieving various designs and various demands of machining. In order to machine complicated curved surfaces, the conventional machine tool has been equipped with a rotatable work table for promoting the deficiency of a traditional machine tool with triple axes. A conventional rotatable work table has a brake mechanism having a brake disk and multiple clutches. The multiple clutches are driven by electrical power to clamp the brake disk for the purpose of stopping the work table from rotating.

However, the multiple clutches driven by electrical power fail to function when encountering a sudden black out. The multiple clutches are unable to clamp the brake disk and fail to stop the rotatable work table, which causes consequences such as damaging work pieces and even damaging the work table or cutters.

To overcome the shortcomings of the brake mechanism of the conventional work table, exemplary embodiments of the present disclosure provide a brake mechanism for a rotary work table of a machine tool to mitigate or obviate the aforementioned problems.

SUMMARY

This section provides a general summary of the disclosure, and is not a comprehensive disclosure of its full scope or all of its features.

An aspect of the present disclosure is to provide a brake mechanism that may rapidly stop a work table from rotating when a sudden black out happens, so as to prevent damage to the mechanism and promote safety in use.

The brake mechanism comprises a brake disk, multiple clutches, and multiple brake assemblies. The brake disk is coaxially connected to a rotatable work table. The multiple clutches are capable of clamping the brake disk. The multiple brake assemblies correspond in position to the multiple clutches. Each one of the multiple brake assemblies has a housing, an abutting shaft inserted in the housing, and multiple elastic units received in the housing and abutting against the abutting shaft. The multiple abutting shafts of the multiple brake assemblies abut against the brake disk for stopping the work table from rotating. A hydraulic system applies hydraulic pressure inside the multiple housings of the multiple brake assemblies and forces the multiple abutting shafts to depart from the corresponding clutch, making the work table rotate again.

The brake mechanism is capable of preventing damage to the work table or cutters for machining when a sudden black out happens. The brake mechanism not only saves the repair expense but also promotes safety in use.

Other aspects, advantages, and novel features of the disclosure will become more apparent from the following detailed description when taken in conjunction with the accompanying drawings.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
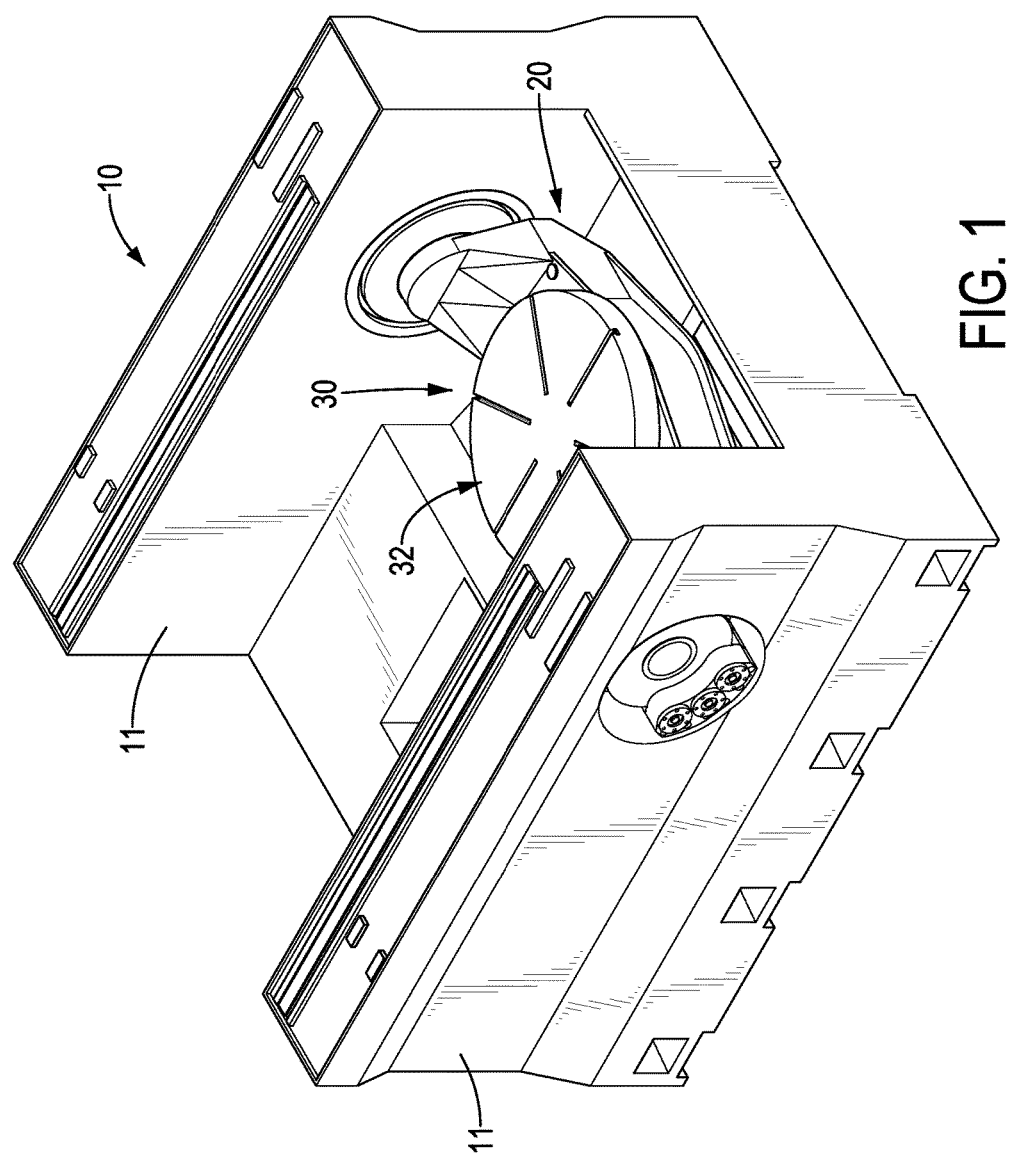
FIG. 1 is a perspective view of a supporting base equipped with a brake mechanism for a rotary work table of a machine tool in accordance with the present disclosure.
Figure 2:
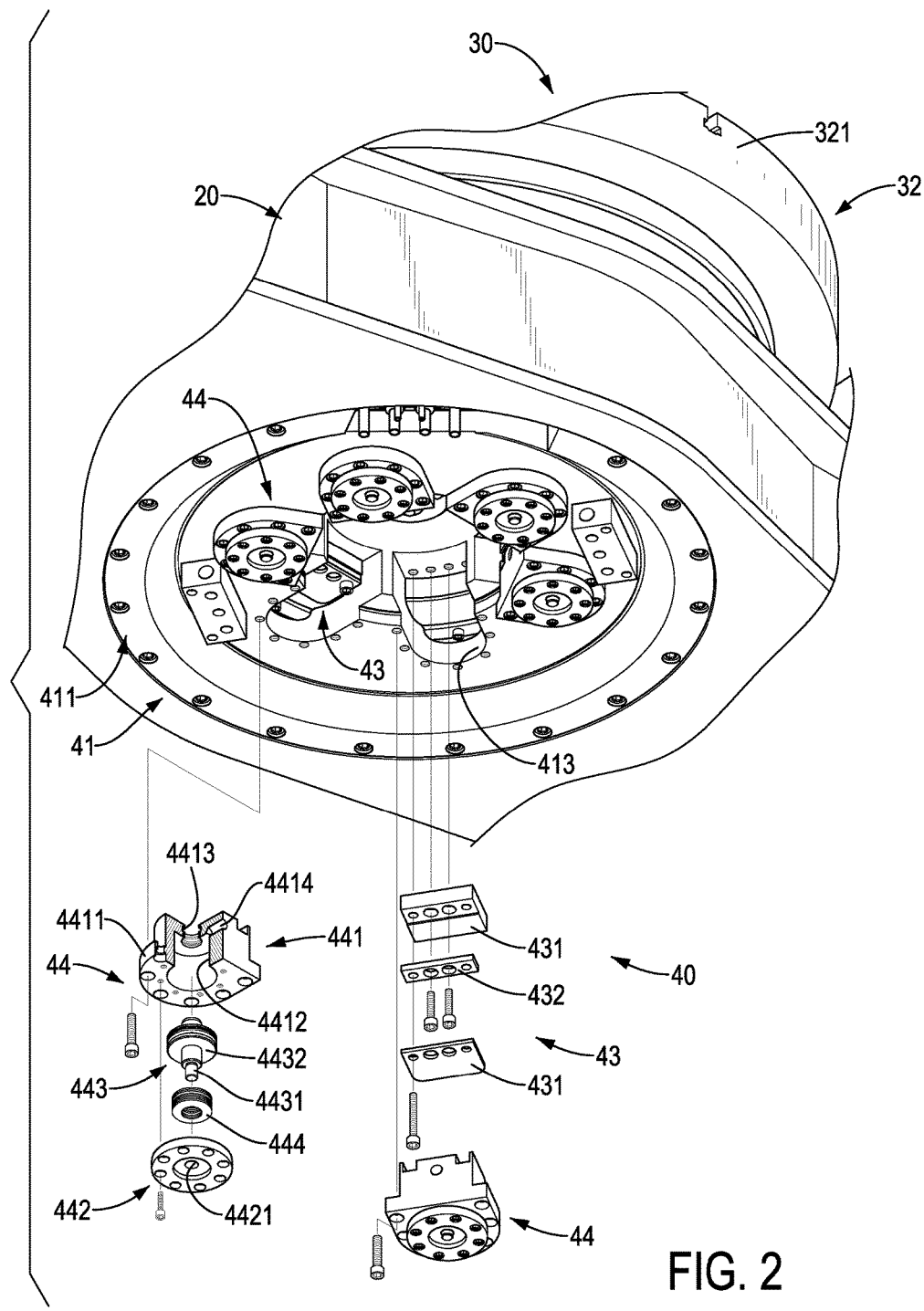
FIG. 2 is a partial exploded perspective view of the brake mechanism in accordance with the present disclosure.
Figure 3:
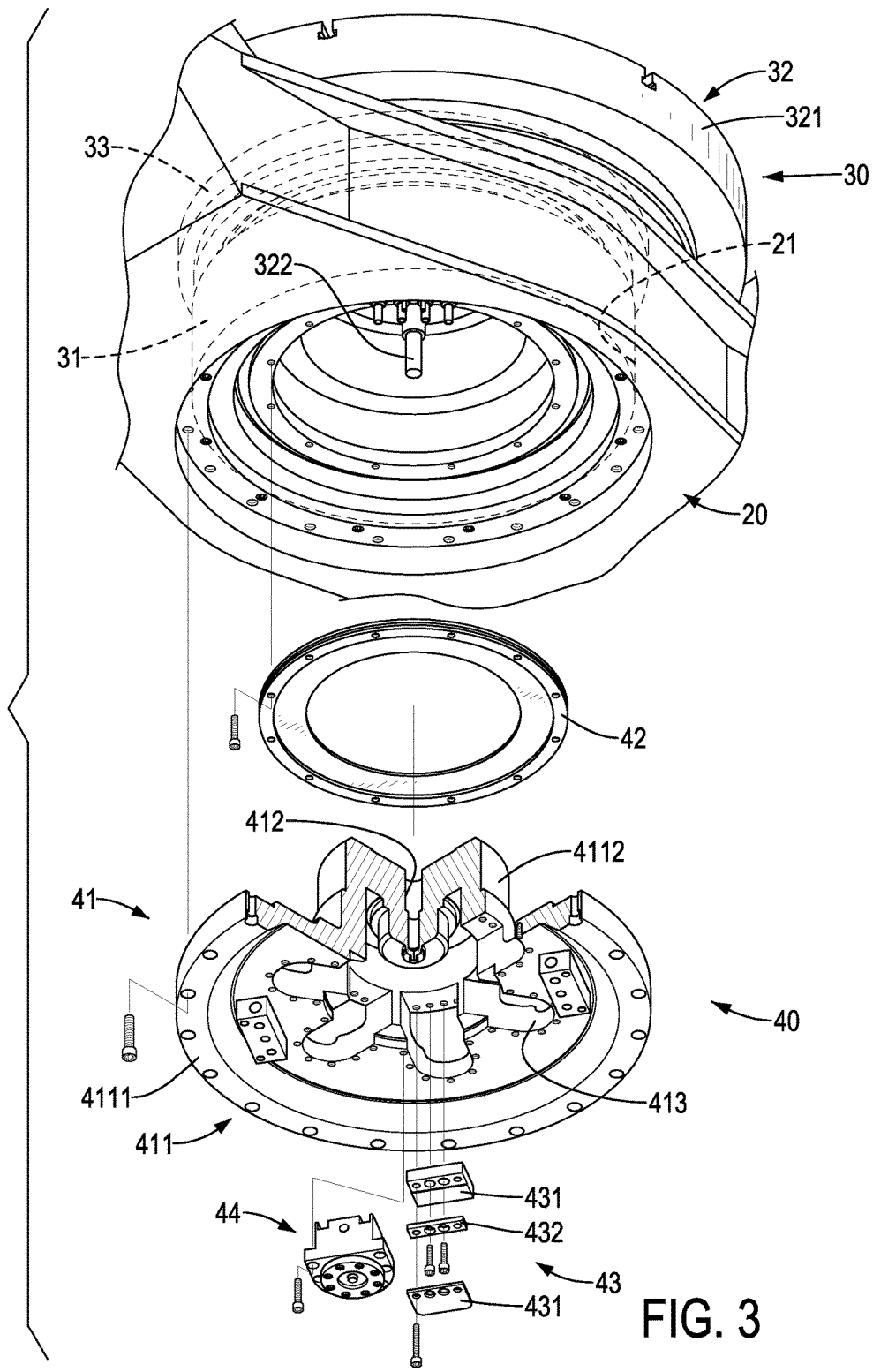
FIG. 3 is another partial exploded perspective view of the brake mechanism in FIG. 2.

With reference to FIGS. 1 to 3, a brake mechanism for a rotary work table of a machine tool in accordance with the present disclosure comprises a supporting base 10, an assembling frame 20, a rotary work table mechanism 30, and a brake mechanism 40. The assembling frame 20 is assembled on the supporting base 10. The rotary work table mechanism 30 and the brake mechanism 40 are assembled on the assembling frame 20.

With reference to FIG. 1, the supporting base 10 has a longitudinal direction and two side walls 11. The two side walls 11 are spaced from each other and face to each other. Each one of the two side walls 11 is disposed along the longitudinal direction of the supporting base 10.

With reference to FIGS. 1 to 4, the assembling frame 20 has two connecting ends and an assembling hole 21. The two connecting ends of the assembling frame 20 are respectively and rotatably connected to the two side walls 11 of the supporting base 10. The assembling hole 21 is formed through a middle portion of the assembling frame 20 and has an internal surface.

With reference to FIGS. 1 to 4, the rotary work table mechanism 30 is assembled in the assembling hole 21 of the assembling frame 20. The rotary work table mechanism 30 has a direct drive motor 31, a work table 32, and a bearing 33. The direct drive motor 31 is annular and is assembled in the assembling hole 21 of the assembling frame 20. The work table 32 has a rotary axis A, a table body 321, a rotary shaft 322, and a surrounding wall 323. The table body 321 has a table surface 3211 facing upward. The rotary shaft 322 is formed on a middle portion of the table body 321. The rotary shaft 322 and the rotary axis A of the work table 32 are coaxial. The rotary shaft 322 extends away from a direction to which the table surface 3211 faces, and extends downward into the assembling hole 21 of the assembling frame 20. The surrounding wall 323 and the rotary shaft 322 are coaxial. The surrounding wall 323 surrounds the rotary shaft 322 and extends downward into the assembling hole 21 of the assembling frame 20. The direct drive motor 31 is annular and is mounted around the surrounding wall 323 of the work table 32. The bearing 33 is mounted around the surrounding wall 323 of the work table 32 and is disposed between the surrounding wall 323 of the work table 32 and the internal surface of the assembling hole 21. The bearing 33 is disposed above the direct drive motor 31.

Figure 4:
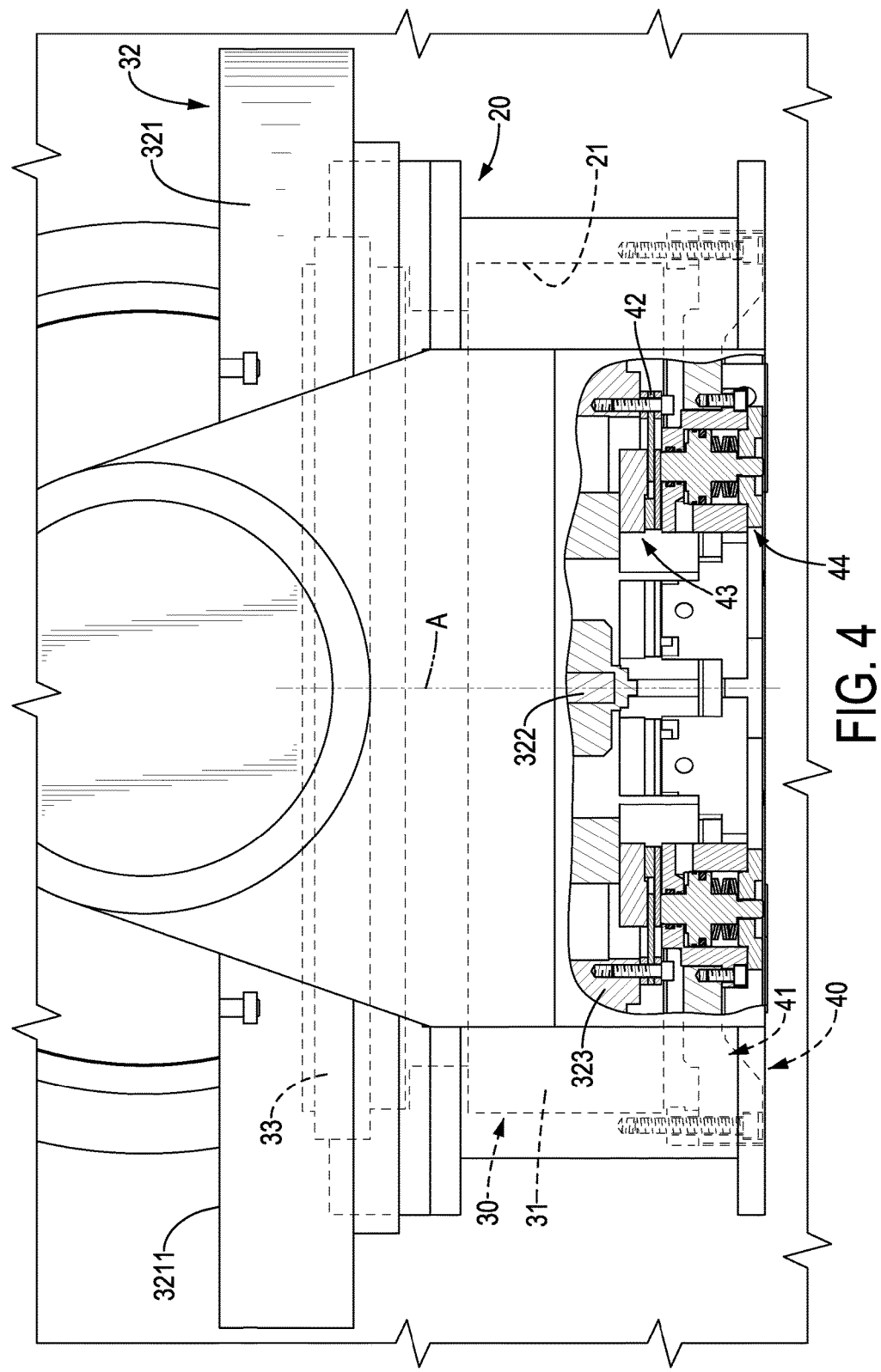
FIG. 4 is a side view in partial section of the brake mechanism in FIG. 2.

With reference to FIGS. 2 to 4, the brake mechanism 40 has an assembling seat 41, a brake disk 42, six clutches 43, and six brake assemblies 44. The assembling seat 41 is connected to the assembling frame 20 and has a seat body 411, a socket 412, and six receiving holes 413. The seat body 411 has a disk portion 4111 and an erected portion 4112. The erected portion 4112 is formed on a middle portion of the disk portion 4111 and has an end face distal from the disk portion 4111. The socket 412 is defined in the end face of the erected portion 4112 and extends downward. The six receiving holes 413 are annularly disposed around the erected portion 4112 of the seat body 411. Each one of the six receiving holes 413 is formed through the disk portion 4111 of the seat body 411.

With reference to FIGS. 2 to 4, the brake disk 42 is annular and has an interior rim, and an exterior rim. Multiple bolts are mounted through the brake disk 42 and screwed on the surrounding wall 323 of the work table 32 to make the brake disk 42 coaxially connected to the work table 32.

With reference to FIGS. 2 to 5, the six clutches 43 are respectively inserted in the six receiving holes 413 of the assembling seat 41. The six clutches 43, the work table 32, and the brake disk 42 are coaxial. The six clutches 43 are screwed on and are fixed to the assembling seat 41 by multiple bolts. The six clutches 43 are connected to the assembling frame 20 by the assembling seat 41. The six clutches 43 are identical in structure, so one of the six clutches 43 is taken as an example for further descriptions. The clutch 43 has two brake pads 431 and a spacing unit 432. The spacing unit 432 is disposed between the two brake pads 431. The two brake pads 431 and the spacing unit 432 form an embedding recess for fitting the interior rim of the brake disk 42. The clutch 43 is mounted in the interior rim of the brake disk 42 via the embedding recess. The two brake pads 431 are vertically spaced from each other. The brake disk 42 is disposed between the two brake pads 431.

With reference to FIGS. 2 to 5, the six brake assemblies 44 are fixed on the assembling seat 41 corresponding to the six clutches 43. Positions of the six brake assemblies 44 are corresponding to the positions of the six clutches 43. Furthermore, the six brake assemblies 44 are respectively disposed below the six clutches 43. The six brake assemblies 44 are identical in structure, so one of the six brake assemblies 44 is taken as an example for further descriptions. The brake assembly 44 has a housing 441, a blocking piece 442, an abutting shaft 443, and multiple elastic units 444.

The housing 441 has a body 4411, a receiving chamber 4412, a through hole 4413, and an inlet 4414. The body 4411 has a surface. The receiving chamber 4412 is formed inside the body 4411, extends toward the work table 32, and has a bottom. The through hole 4413 is defined in the bottom of the receiving chamber 4412, extends toward the work table 32, and is formed through the body 4411. The through hole 4413 and the receiving chamber 4412 are coaxial. The inlet 4414 extends from the surface of the body 4411 to the receiving chamber 4412. The inlet 4414 communicates with a hydraulic system. The blocking piece 442 is fixed to the body 4411 by multiple bolts screwed on the body 4411. The blocking piece 442 blocks the receiving chamber 4412 and has a shaft hole 4421 communicating with the receiving chamber 4412.

Figure 5:
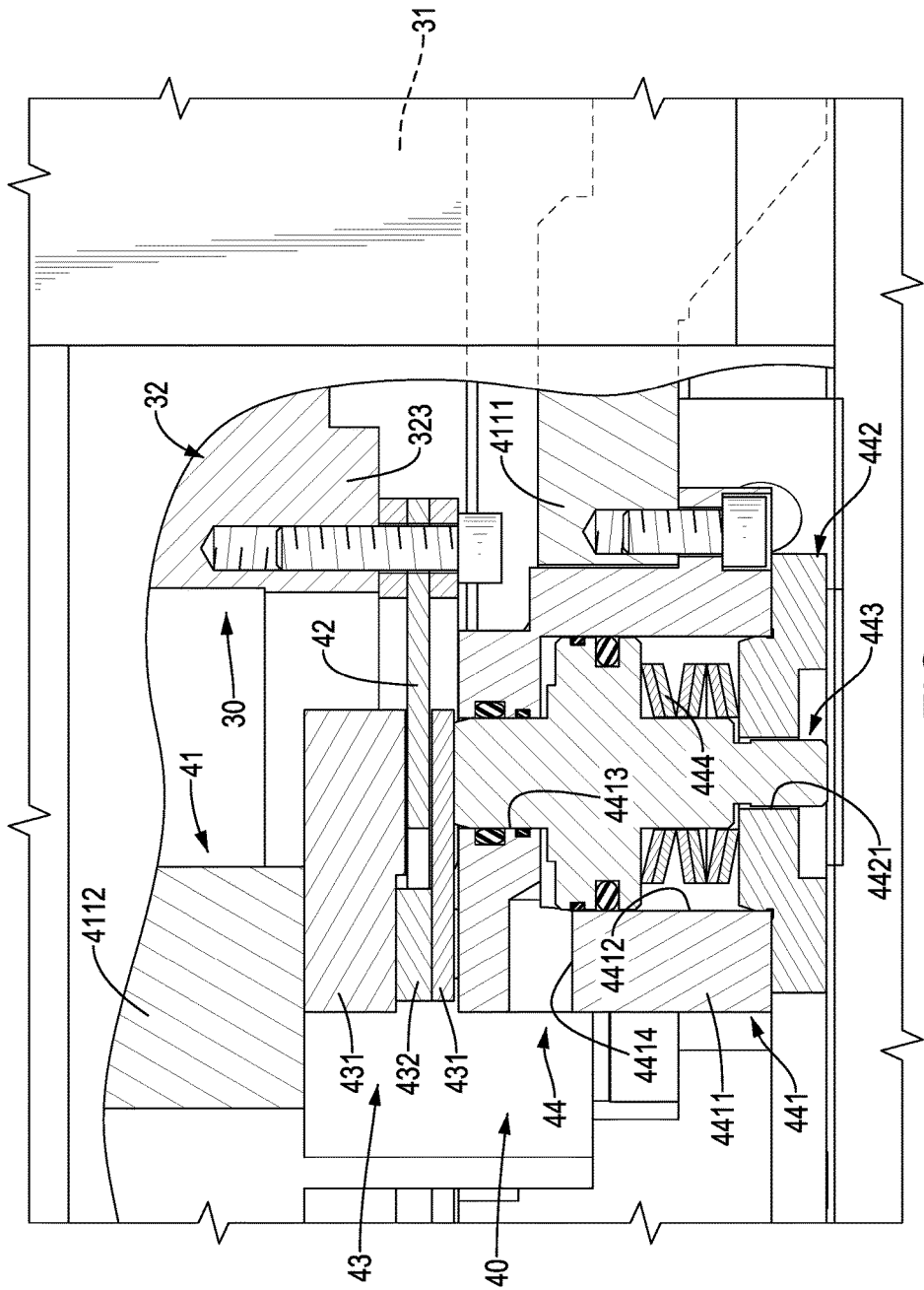
FIG. 5 is an enlarged side view in partial section of the brake mechanism in FIG. 2.

With reference to FIGS. 2, 4, and 5, the abutting shaft 443 of the brake assembly 44 is inserted in the receiving chamber 4412 of the housing 441. The abutting shaft 443 has a shaft body 4431 and a blocking flange 4432. The shaft body 4431 has a peripheral surface, an abutting end, and a positioning end. The abutting end of the shaft body 443 and the positioning end of the shaft body 4431 are opposite each other. The abutting end of the shaft body 4431 is inserted in the through hole 4413 of the housing 441 of the brake assemblies 44 and faces to a corresponding clutch 43. The blocking flange 4432 is annularly formed on the peripheral surface of the shaft body 4431. The multiple elastic units 444 of the brake assembly 44 are received in the receiving chamber 4412 of the housing 441. The multiple elastic units 444 abut against the blocking flange 4432 and the blocking piece 442. In addition, the multiple elastic units 444 of each one of the brake assemblies 44 are Belleville washers mounted around the shaft body 4431.

Figure 6:
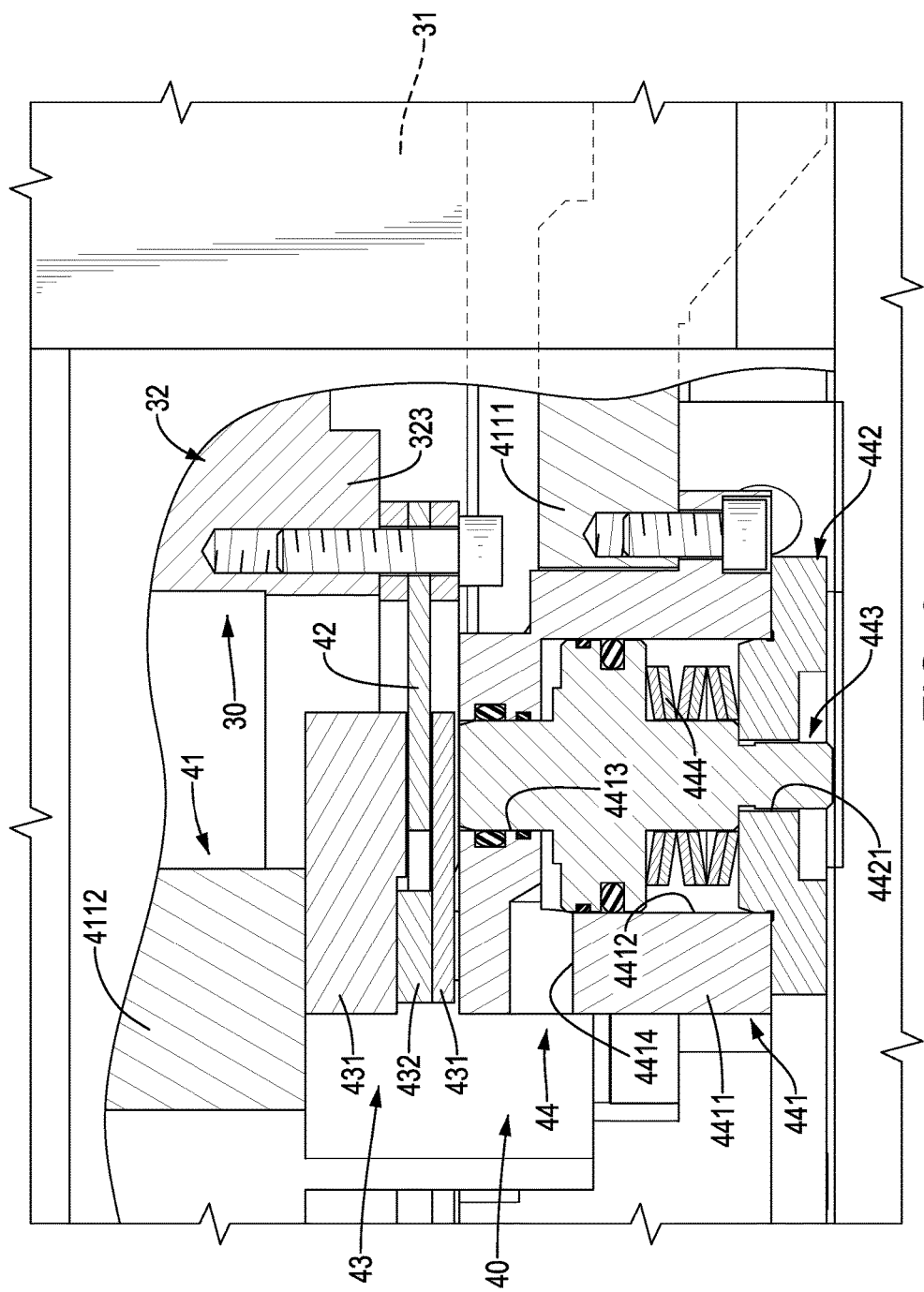
FIG. 6 is another enlarged side view in partial section of the brake mechanism in FIG. 2.

With reference to FIGS. 5 and 6, one of the six brake assemblies 44 and the corresponding one of the six clutches 43 of said one of the six brake assemblies 44 are taken as an example for further descriptions. The multiple elastic units 444 of the brake assembly 44 abut against the blocking flange 4432 of the abutting shaft 443 of the brake assembly 44. The abutting end of the shaft body 4431 of the abutting shaft 443 protrudes out of the through hole 4413 of the housing 441 of the brake assembly 44 and abuts against one of the two brake pads 431 of the corresponding clutch 43. Then the corresponding clutch 43 clamps the brake disk 42 to stop the work table 32 connected to the brake disk 42 from rotating.

When the hydraulic system connecting with the inlet 4414 of the housing 441 of the brake assembly 44 applies hydraulic pressure inside the receiving chamber 4412 of the housing 441 through the inlet 4413, hydraulic oil inside the receiving chamber 4412 is forced into the receiving chamber 4412 through the inlet 4414 and abuts against the blocking flange 4432 of the abutting shaft 443. The abutting end of the shaft body 4431 of the abutting shaft 443 departs from said corresponding brake pad 431 abutted by the abutting shaft 443. The positioning end of the shaft body 4431 of the abutting shaft 443 protrudes out from the shaft hole 4421 of the blocking piece 442 of the brake assembly 44. The blocking flange 4432 abuts against the multiple elastic units 444 and compresses the multiple elastic units 444. Once the hydraulic system ceases applying hydraulic pressure inside the receiving chamber 4412, the compressed multiple elastic units 444 restore and abut against the blocking flange 4432 of the abutting shaft 443 again. The abutting end of the shaft body 4431 abuts against said brake pad 431 of the corresponding clutch 43 again. The corresponding clutch 43 clamps the brake disk 42. And once again, the work table 32 connected to the brake disk 42 is stopped from rotating.

Each one of the six brake assemblies 44 utilizes the multiple elastic units 444 forcing the abutting shaft 443 to abut against a corresponding clutch 43 of one of the six brake assemblies 44, makes the corresponding clutch 43 clamp the brake disk 42, and stops the work table 32 from rotating. The hydraulic system applies hydraulic pressure to force the abutting shaft 443 to depart from the corresponding clutch 43. And the work table 32 rotates again. The brake mechanism 40 in accordance with the present disclosure is capable of preventing damage to the work table 32 or cutters for machining when a sudden black out happens. The brake mechanism 40 not only saves the repair expense but also promotes safety in use.

Even though numerous characteristics and advantages of exemplary embodiments of the present disclosure have been set forth in the foregoing description, together with details of the structure and function, the present disclosure is illustrative only, and changes may be made in detail, especially in matters of shape, size, and arrangement of parts within the principles of the present disclosure to the full extent indicated by the broad general meaning of the terms in which the appended claims are expressed. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A brake mechanism comprising:
   a brake disk coaxially connected to a rotatable work table;
   multiple clutches connected to an assembling frame; each one of the multiple clutches having
      two brake pads, the brake disk disposed between the two brake pads; and
   multiple brake assemblies corresponding in position to the multiple clutches; each one of the multiple brake assemblies having
      a housing having
         a body having a surface;
         a receiving chamber formed inside the body; and
         an inlet defined in the surface of the body and extending to the receiving chamber;
      an abutting shaft inserted in the receiving chamber and having
         a shaft body having a peripheral surface and an abutting end facing to a corresponding one of the clutches and capable of protruding from the body and abutting against one of the two brake pads of the corresponding clutch; and
         a blocking flange formed on the peripheral surface of the shaft body; and
      multiple elastic units received in the receiving chamber and abutting against the blocking flange.

2. The brake mechanism as claimed in claim 1, wherein the multiple elastic units of each one of the brake assemblies are Belleville washers; and
   the multiple elastic units of each one of the brake assemblies are mounted around the shaft body of the abutting shaft of the brake assembly.

3. The brake mechanism as claimed in claim 2, wherein each one of the multiple brake assemblies has a blocking piece;
   the receiving chamber of the housing of the brake assembly extends from the surface of the housing toward the work table;
   the blocking piece is fixed to the body of the housing and blocks the receiving chamber; and
   the multiple elastic units abut against the blocking piece.

4. The brake mechanism as claimed in claim 3, wherein the blocking piece of each one of the multiple brake assemblies has a shaft hole defined through a middle portion of the blocking piece and communicating with the receiving chamber of the housing of the brake assembly.

5. The brake mechanism as claimed in claim 4, wherein each one of the multiple clutches has a spacing unit disposed between the two brake pads of the clutch.

6. The brake mechanism as claimed in claim 5, wherein an assembling seat is connected to the assembling frame; and
   the multiple clutches are fixed to the assembling seat and are connected to the assembling frame by the assembling seat.

7. The brake mechanism as claimed in claim 6, wherein the assembling seat has a seat body having
   a disk portion; and
   multiple receiving holes defined through the disk portion; and
   the multiple clutches are respectively inserted in the multiple receiving holes.

8. The brake mechanism as claimed in claim 1, wherein each one of the multiple clutches has a spacing unit disposed between the two brake pads of the clutch.

9. The brake mechanism as claimed in claim 1, wherein each one of the multiple brake assemblies has a blocking piece;
   the receiving chamber of the housing of the brake assembly extends from the surface of the housing toward the work table;
   the blocking piece is fixed to the body of the housing and blocks the receiving chamber; and
   the multiple elastic units abut against the blocking piece.

10. The brake mechanism as claimed in claim 9, wherein the blocking piece of each one of the multiple brake assemblies has a shaft hole defined through a middle portion of the blocking piece and communicating with the receiving chamber of the housing of the brake assembly.

* * * * *